United States Patent
Wu et al.

(10) Patent No.: US 12,505,462 B2
(45) Date of Patent: Dec. 23, 2025

(54) ACTIONABLE KPI-DRIVEN SEGMENTATION

(71) Applicant: Adobe Inc., San Jose, CA (US)

(72) Inventors: Xiang Wu, Mountain View, CA (US); Zhenyu Yan, Cupertino, CA (US); Yi-Hong Kuo, Sunnyvale, CA (US); Wuyang Dai, San Jose, CA (US); Polina Bartik, San Jose, CA (US); Abhishek Pani, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 92 days.

(21) Appl. No.: 18/132,758

(22) Filed: Apr. 10, 2023

(65) Prior Publication Data

US 2023/0360071 A1    Nov. 9, 2023

Related U.S. Application Data

(63) Continuation of application No. 16/191,289, filed on Nov. 14, 2018, now Pat. No. 11,651,383.

(51) Int. Cl.
*G06Q 30/0204* (2023.01)
*G06F 17/16* (2006.01)
(Continued)

(52) U.S. Cl.
CPC ......... *G06Q 30/0204* (2013.01); *G06F 17/16* (2013.01); *G06Q 10/06393* (2013.01); *G06Q 10/067* (2013.01); *G06N 20/00* (2019.01)

(58) Field of Classification Search
CPC ........ G06F 17/16; G06N 20/00; G06N 7/005; G06Q 10/06393; G06Q 10/067; G06Q 30/0204
See application file for complete search history.

(56) References Cited

U.S. PATENT DOCUMENTS

| | | |
|---|---|---|
| 10,410,273 B1 | 9/2019 | Finkelstein et al. |
| 2012/0254092 A1 * | 10/2012 | Malov ................ G06Q 30/0201 706/52 |

(Continued)

FOREIGN PATENT DOCUMENTS

| | | | | |
|---|---|---|---|---|
| WO | WO-2015152933 A1 * | 10/2015 | ............. | G06Q 30/02 |
| WO | WO-2016191737 A2 * | 12/2016 | ............. | G06F 3/016 |

OTHER PUBLICATIONS

Secundo et al., "Intellectual capital in the age of Big Data: establishing a research agenda". Journal of Intellectual Capital vol. 18 No. 2, 2017, pp. 242-261. (Year: 2017).*

(Continued)

*Primary Examiner* — Pan G Choy
(74) *Attorney, Agent, or Firm* — Shook, Hardy & Bacon LLP

(57) ABSTRACT

An improved analytics system generates actionable KPI-based customer segments. The analytics system determines predicted outcomes for a key performance indicator (KPI) of interest and a contribution value for each variable indicating an extent to which each variable contributes to predicted outcomes. Topics are generated by applying a topic model to the contribution values for the variables. Each topic comprises a group of variables with a contribution level for each variable that indicates the importance of each variable to the topic. User segments are generated by assigning each user to a topic based on attribution levels output by the topic model.

16 Claims, 10 Drawing Sheets

(51) Int. Cl.
  *G06N 20/00*     (2019.01)
  *G06Q 10/0639*   (2023.01)
  *G06Q 10/067*    (2023.01)

(56) References Cited

U.S. PATENT DOCUMENTS

| | | | |
|---|---|---|---|
| 2017/0070398 A1* | 3/2017 | Singhal | G06Q 10/06315 |
| 2017/0076304 A1* | 3/2017 | Toth | G06Q 30/0202 |
| 2017/0132553 A1* | 5/2017 | Theirl | G06F 16/2246 |
| 2018/0225685 A1* | 8/2018 | Kim | G06Q 30/0202 |
| 2019/0080448 A1* | 3/2019 | Dewitt | G06V 10/243 |
| 2019/0156196 A1* | 5/2019 | Zoldi | G06N 3/08 |

OTHER PUBLICATIONS

Ettl et al., "Business Performance Management System for CRM and Sales Execution", IBM T.J Watson Research Center, Yorktown Heights, NY 10598, USA. Proceedings of the 16th International Workshop on Database and Expert System Application (2005), IEEE (Year: 2005).*

Yao et al., "Using SOM-Ward clustering and predictive analytics for conducting customer segmentation", Department of Information Technologies, Abo Akademi University, Turku, Finland. 2010 IEEE International Conference on Data Mining Workshops. (Year: 2010).*

Schuler, A., "Some Methods to Compare the Real-World Performance of Causal Estimators", Submitted to the program in Biomedical Informatics and the Committee on Graduate Studies of Stanford University, p. 85 (Sep. 2018).

Kimball, R., and Ross, M., "The Data Warehouse Toolkit 3rd—The Definitive Guide to Dimensional Modeling", pp. 601 (2011).

* cited by examiner

| USER_ID | Reason Codes | | | | |
|---|---|---|---|---|---|
| | Product Launch Trend | Product Launch | Product A download | ... | Product Z download |
| 0000 | 10 | 9 | 0 | 0 | 0 |
| 0001 | 0 | 0 | 8 | 0 | 0 |
| 0002 | 0 | 0 | 5 | 7 | 9 |
| 0003 | 0 | 0 | ... | ... | ... |
| 0004 | ... | ... | ... | ... | ... |

FIG. 7A

| Topic | Top reason codes and their weights | | | | | |
|---|---|---|---|---|---|---|
| | Top reason code 1 | Weight | Top reason code 2 | Weight | Top reason code 3 | Weight |
| 1 | Product launch trend | 0.22 | Product launch | 0.211 | Product C launch | 0.21 |
| 2 | Subscription attribute | 0.419 | Product A launch | 0.077 | Customer profile attribute | 0.062 |
| 3 | Product launch number | 0.258 | Product B launch | 0.153 | Product D launch | 0.128 |
| 4 | Promo | 0.7 | Subscription attribute | 0.182 | Customer profile attribute | 0.023 |

FIG. 7B

| USER_ID | Attribution to Topics | | | |
|---|---|---|---|---|
| | Topic # | | | |
| | 1 | 2 | 3 | 4 |
| 0000 | .9 | .1 | 0 | 0 |
| 0001 | 0 | .05 | .25 | .7 |
| 0002 | .04 | .6 | .3 | .06 |
| 0003 | 0 | 0.05 | .89 | .06 |
| 0004 | 0 | 0 | 1 | 0 |

FIG. 7C

| Segment | Reason code(s) characterizing segment | Description |
|---|---|---|
| <Descriptive segment name 1> | Product launch trend, product launch | Previously active users with no recent usage |
| <Descriptive segment name 2> | Previous subscriber | Subscribers who have cancelled in the past |
| <Descriptive segment name 3> | Subscription attribute, product launch | Nearing the end of subscription term with low product usage |
| <Descriptive segment name 4> | Product A launch, Product B launch, Product C launch | No usage of core products |
| <Descriptive segment name 5> | Subscription attribute, product launch | Nearing the end of subscription term with a recent increase in product usage |

FIG. 7D

ACTIONABLE KPI-DRIVEN SEGMENTATION

CROSS-REFERENCE TO RELATED APPLICATIONS

This application is a continuation of, and claims priority to, U.S. application Ser. No. 16/191,289, filed Nov. 14, 2018, the contents of which are hereby incorporated by reference.

BACKGROUND

Business intelligence or analytics systems are computer-based systems that collect and analyze data related to customers. Such analytics systems can provide insight about customers, products, and/or business trends based on analyzed data. Analytics systems often provide customer segmentation features to identify groups of customers with similar characteristics. In many cases, customer segmentation provided by existing analytics systems can indicate correlation between customers and an outcome but not necessarily designate actionable variables that indicate why a particular outcome might occur. Predicting customer outcomes using accurate customer segmentation can, for instance, allow for the creation of targeted campaigns generated to obtain a particular goal for a specific customer. Conventional methods performed by existing analytics systems have used several approaches to perform customer segmentation. However, the conventional methods used by existing analytics systems have had limited success in generating actionable customer segments tied to a specific outcome of interest.

SUMMARY

Embodiments of the present disclosure are directed towards an improved analytics system that generates actionable customer segments based on predicted outcomes for a key performance indicator (KPI). In accordance with embodiments of the present disclosure, the KPI analytics system predicts outcomes for a KPI of interest. The predicted outcomes can be based on variables related to user behavior and/or user attributes. Each of these variables can have a contribution value that indicates an extent to which the variable contributes to the overall predicted outcome. The KPI analytics system generates topics using the contribution values for the variables. In this way, each topic can comprise a group of variables with corresponding contribution levels for each variable that indicates the importance of each variable to the topic. The KPI analytics system segments users by assigning users to the topics, such that each user segment corresponds with one or more topics. Each segment reflects the relevant variables that impact outcomes for the KPI of interest, thus providing information for what actions to take for each segment to improve outcomes. Advantageously, such a KPI analytics system combines the explanatory power of predictive modeling with unsupervised learning to provide insight into analyzed user behavior data. In this way, the KPI analytics system can provide insight into actionable customer segments that can effectively identify variables that significantly affect a particular outcome. For instance, these actionable customer segments can be used in identifying customers to target with marketing campaigns.

BRIEF DESCRIPTION OF THE DRAWINGS

FIG. 7A depicts a user-reason code matrix, in accordance with various embodiments of the present disclosure.

FIG. 7B depicts a topic matrix, in accordance with various embodiments of the present disclosure.

FIG. 7C depicts a user-topic matrix, in accordance with various embodiments of the present disclosure.

FIG. 7D depicts a descriptive segmentation results table, in accordance with various embodiments of the present disclosure.

DETAILED DESCRIPTION

Figure 1A:
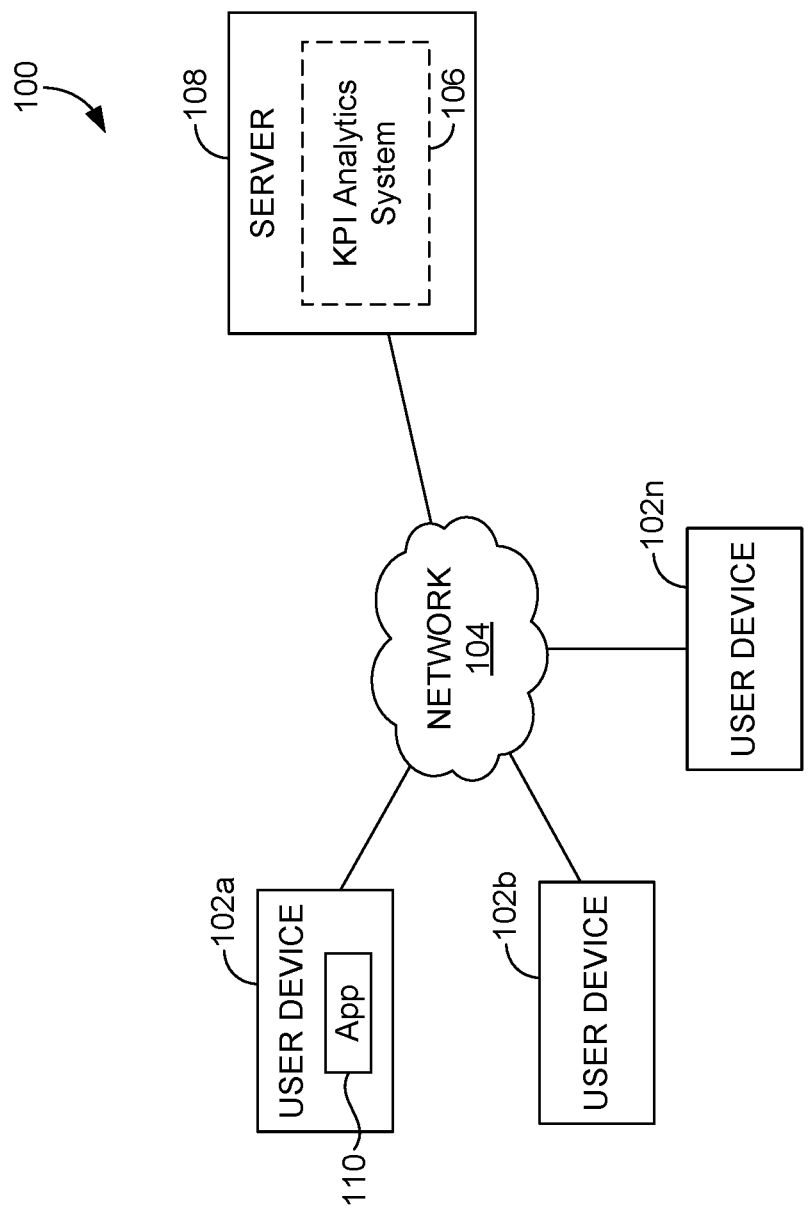
FIG. 1A depicts an example configuration of an operating environment in which some implementations of the present disclosure can be employed, in accordance with various embodiments.

Various terms and phrases are used herein to describe embodiments of the present invention. Some of the terms and phrases used herein are described here, but more details are included throughout the description.

An "outcome" refers to a particular business outcome and/or actionable result. An outcome can be based on a business key performance indicator (KPI). A "KPI" is a performance measurement indicating how effectively a company is achieving a key business objective. By way of example to illustrate, a KPI could be churn rate for subscribers of a product or service, and an outcome could be whether a particular customer unsubscribes from the product or service. While churn is used as an example herein for illustrations purposes, KPIs of interest can include any key business objective (e.g., churn, conversion, upsell, downsell, customer retention, any business-related action).

A "variable" refers to features related to user behavior and user attributes. Variables can be designated using reason codes. A "reason code" is generally a label for a variable A "propensity model" is a model that provides a predicted outcome for a customer that reflects a likelihood of a particular outcome of interest (e.g., an outcome related to a KPI of interest). A propensity model can be generated using historical user behavior data and/or user attributes correlated with known outcomes of interest. A propensity model can also provide raw contribution scores for various variables reflecting the extent to which the variables affected the predicted outcome.

A "user-reason code matrix" can be generated based on the propensity model and indicate, for each customer, contribution values for reason codes based on importance of variables to a predicted outcome. In some instances, the contribution values in the user-reason-code matrix are raw contribution scores from the propensity model, while in other instances, the contributions values are weights derived from the raw contribution scores.

A "topic model" is a model that is applied to a user-reason code matrix to generate a topic matrix and a user-topic matrix. For example, Non-Negative Matrix Factorization and/or Latent Dirichlet Allocation can be used as the topic model.

A "topic matrix" contains topics along with reason code distributions. The reason code distributions for a topic can be a contribution level for each reason code that indicates which reason codes are the most important for defining the topic (e.g., how important each reason code is in defining a topic). The topic matrix can be normalized such that the sum of the contribution levels is equal to one. Topics from the topic matrix can be used to define customer segments.

A "user-topic matrix" contains user identifiers along with attribution levels to different topics. The user-topic matrix can be leveraged to create segments by assigning a customer to at least one topic (i.e., segment) based on the maximum attribution value. The user-topic matrix can be normalized such that for each user, the overall attribution for all the topics is equal to one.

A vast amount of data can be gathered that relates to customers of a business (e.g., subscription-based businesses). Such data can relate to customer characteristics and behaviors as the customer interacts with one or more products related to the business. Analytics systems are typically employed to process the vast amount of data to assist in decision-making. Often, analytic systems perform automated customer segmentation to identify groups of customers with similar characteristics. Existing analytics systems use several approaches to attempt to perform customer segmentation, but each of these approaches have drawbacks.

Some existing analytics systems use rule-based approaches that involve dividing customers according to pre-defined metrics. Such metrics can include interaction patterns and/or customer attributes (e.g., interaction patterns such as spending or usage patterns) (e.g., customer attributes such as location, occupation, etc.). However, rule-based approaches often segment customers into groups that are not correlated with outcomes of interest. Further, creating rules for rule-based approaches is time-consuming and prevents frequent updating of the rules to adjust for changes in customer behavior over time.

Other analytics systems use unsupervised learning approaches to try to generate useful customer segments. In unsupervised learning, various user characteristics can be input into an unsupervised clustering learning algorithm (e.g., k-means and/or topic modeling). Such a learning algorithm can be used to generate user segments based on similarity metrics. However, typical clustering learning algorithms do not work well with categorical variables. Oftentimes, segments produced by unsupervised learning, similar to rule-based approaches, are not correlated to an outcome of interest.

Further analytics system use predictive modeling approaches for customer segmentation. In predictive modeling, various user characteristics can be input into a supervised learning algorithm, (e.g., a regression model). This model can generate scores indicating a likelihood of a particular outcome for a user. These scores can be used to create customer segments. However, segments based on scores provide little to no information on why a particular customer is likely to perform/take an action of interest, and are therefore not directly actionable.

As such, existing analytics systems are generally deficient in generating user segments that effectively tie customers to a particular business outcome and/or actionable result, such as a business KPI. Additionally, existing analytics systems are deficient in generating user segments that provide actionable information for decision-making.

Accordingly, embodiments of the present disclosure are directed to an improved analytics system (referred to herein as a KPI analytics system) that addresses the technical deficiencies of existing analytics systems with respect to customer segmentation. In particular, and as described herein, the KPI analytics system generates actionable KPI-based customer segments. In this regard, the KPI analytics system condenses user behavior data into clusters that reflect why a group of customers is likely to reach/perform a particular outcome (e.g., purchase a product, subscribe to a product, upsell, downsell, etc.). Advantageously, such a system can combine the explanatory power of predictive modeling with unsupervised learning to provide insight into analyzed user behavior data. This insight results in actionable customer segments that can effectively identify variables that significantly affect a particular outcome. For instance, the KPI analytics system can accurately identify variables that plays a large role in the likelihood of a designated outcome occurring. Knowing variables that are indicators of an outcome can allow for identifying customers with those variables and understand why those customers have a certain likelihood of reaching/performing the outcome based on those variables. Identifying customers based on such variables can be used to generate targeted campaigns for those customers. For example, if a user has variables that indicate a high likelihood that the user will unsubscribe from a subscription, a campaign targeted to the particular user can be generated based on the reasoning for the high likelihood reflected by the variables (e.g., a customer that was previously active with no product usage in the last month can be targeted by sending new information about the product). In this way, the actionable KPI-based customer segments generated by the KPI analytics system can be used, for instance, for greater personalization when generating targeted marketing campaigns.

As described herein, the KPI analytics system generates actionable KPI-driven customer segments. At a high-level, to generate KPI-driven customer segments, the KPI analytics system builds a propensity model for a KPI of interest to generate predicted outcomes for customers that reflect the likelihood that each customer will reach/perform a particular outcome related to the KPI of interest. The propensity model can be generated using historical user behavior data and/or user attributes correlated with known outcomes. Combining user-level behavior features (e.g., product use frequency, product use recency, product variety, etc.) and user attributes (e.g., age of subscription, country, skill level, etc.) along with known outcomes can be used to train the propensity model (e.g., using machine learning). When applied to existing customers, the propensity model generates a predicted outcome for each customer indicative of a likelihood of the outcome of interest for which the model was trained. Additionally, the propensity model provides raw contribution scores for variables indicating an extent to which each variable contributed to the predicted outcome for a customer. These variables can be designated using reason codes. A reason code in the present disclosure can generally be defined as a name for a variable from the propensity model.

A topic model is applied to the user-reason code matrix to generate a topic matrix and a user-topic matrix. Non-Negative Matrix Factorization and/or Latent Dirichlet Allocation can be used as the topic model. The topic matrix contains all topics along with reason code distributions (e.g., based on a contribution level for each reason code determined by the topic model). The reason code distributions can indicate which reason codes are the most important for defining a topic (e.g., how important each reason code is in defining a topic). Topics from the topic matrix can define segments. In this way, customers associated with the same topic are customers with similar reason codes (i.e., variables) for a particular outcome (e.g., customers with similar reasons to churn). The topic matrix can be output in a graphical user interface (GUI). Such a GUI of the topic matrix can present a limited set of data to a user. For example, a limited set of topics can be designated such that the topics remain informative of customer segmentation while preventing significant overlap. For example, instead of returning all topics in a KPI analytics system along with associated contribution levels for all reason codes, a limited set can be selected and presented (e.g., top two or three topics although more topics could be selected in some implementations).

The user-topic matrix contains, for each user, a user identifier along with an attribution level for each of a number of different topics. In this way, the user-topic matrix can be leveraged to create customer segments by assigning a customer to a topic (i.e., segment) having the maximum attribution value for the customer. In some implementations, a customer is assigned to only one topic, while in other embodiments, a customer can be assigned to multiple topics. Such a user-topic matrix can be output in a graphical user interface (GUI). Such a GUI of the user-topic matrix can present a limited set of data to a user. For example, a limited set of topic attributions can be presented in the matrix. For example, instead of returning all topics attributions for each customer, a limited set can be selected and presented (e.g., top two or three topic attributions).

Topics for customer segments from the user-topic matrix and topic matrix can be translated into descriptive terms that accurately convey what it means for a customer to be assigned to a particular topic. Assigning a customer to a topic (e.g., segmentation) can be used to determine applicable reason code(s) for the customer. These reason codes can characterize the topic and be used to generate a description of the customers that comprise the topic segment. Such results can be used to analyze at the proportion of the customer base that falls into each segment. For example, these results can be utilized in business applications to determine the areas of opportunity (e.g., customers that are worth targeting in campaigns versus customers that are not worth targeting).

Turning now to FIG. 1A, an example configuration of an operating environment is depicted in which some implementations of the present disclosure can be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8.

It should be understood that operating environment 100 shown in FIG. 1A is an example of one suitable operating environment. Among other components not shown, operating environment 100 includes a number of user devices, such as user devices 102a and 102b through 102n, network 104, and server(s) 108. Each of the components shown in FIG. 1A may be implemented via any type of computing device, such as one or more of computing device 800 described in connection to FIG. 8, for example. These components may communicate with each other via network 104, which may be wired, wireless, or both. Network 104 can include multiple networks, or a network of networks, but is shown in simple form so as not to obscure aspects of the present disclosure. By way of example, network 104 can include one or more wide area networks (WANs), one or more local area networks (LANs), one or more public networks such as the Internet, and/or one or more private networks. Where network 104 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, network 104 is not described in significant detail.

It should be understood that any number of user devices, servers, and other components may be employed within operating environment 100 within the scope of the present disclosure. Each may comprise a single device or multiple devices cooperating in a distributed environment.

User devices 102a through 102n can be any type of computing device capable of being operated by a user. For example, in some implementations, user devices 102a through 102n are the type of computing device described in relation to FIG. 8. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

The user devices can include one or more processors, and one or more computer-readable media. The computer-readable media may include computer-readable instructions executable by the one or more processors. The instructions may be embodied by one or more applications, such as application 110 shown in FIG. 1A. Application 110 is referred to as a single application for simplicity, but its functionality can be embodied by one or more applications in practice. As indicated above, the other user devices can include one or more applications similar to application 110.

The application(s) may generally be any application capable of facilitating the exchange of information between the user devices and the server(s) 108 for carrying out actionable KPI-driven customer segmentation. In some implementations, the application(s) comprises a web application, which can run in a web browser, and could be hosted at least partially on the server-side of environment 100. In addition, or instead, the application(s) can comprise a dedicated application, such as an application having customer analytics functionality. In some cases, the application is integrated into the operating system (e.g., as a service). It is therefore contemplated herein that "application" be interpreted broadly.

In accordance with embodiments herein, the application 110 facilitates actionable KPI-driven customer segmentation. In embodiments, a KPI of interest can be selected, for instance, by a user of application 110. In some implementations, various propensity models have been previously generated for each KPI of interest. In other instances, a user can also designate one or more additional KPIs of interest to trigger the training of a propensity model for each designated KPI of interest. Based on the designated KPI of interest, KPI-driven customer segmentation is performed. Results of this segmentation is output to a user, for example, via the user device 102a. Such output can be in a raw form (e.g., matrices indicating topics for which a customer has the greatest attribution value and an indication of which variables are the most important for each topic). Such an output can also be in a more processed form (e.g., a table with descriptive segment names, important variables for the particular outcome, and descriptions of customers typically in the customer segmentation). As an example, application 110 can be an application associated with ADOBE CREATIVE CLOUD.

As described herein, server 108 facilitates actionable KPI-driven customer segmentation via KPI analytics system 106. Server 108 includes one or more processors, and one or more computer-readable media. The computer-readable media includes computer-readable instructions executable by the one or more processors. The instructions may optionally implement one or more components of KPI analytics system 106, described in additional detail below.

KPI analytics system 106 generates PKI-driven actionable customer segments. The system employs a combination of propensity models and topic modeling to provide both the explanatory power of predictive modeling to predict outcomes and unsupervised learning to provide more insight into the why certain outcomes are predicted. In this regard, KPI analytics system 106 can condense user behavior data into clusters that reflect why a group of customers is likely to reach/perform a particular outcome (e.g., purchase a product, subscribe to a product, upsell, downsell, etc.).

For cloud-based implementations, the instructions on server 108 may implement one or more components of KPI analytics system 106, and application 110 may be utilized by a user to interface with the functionality implemented on server(s) 108. In some cases, application 110 comprises a web browser. In other cases, server 108 may not be required, as further discussed with reference to FIG. 1B. For example, the components of KPI analytics system 106 may be implemented completely on a user device, such as user device 102a. In this case, KPI analytics system 106 may be embodied at least partially by the instructions corresponding to application 110.

Figure 1B:
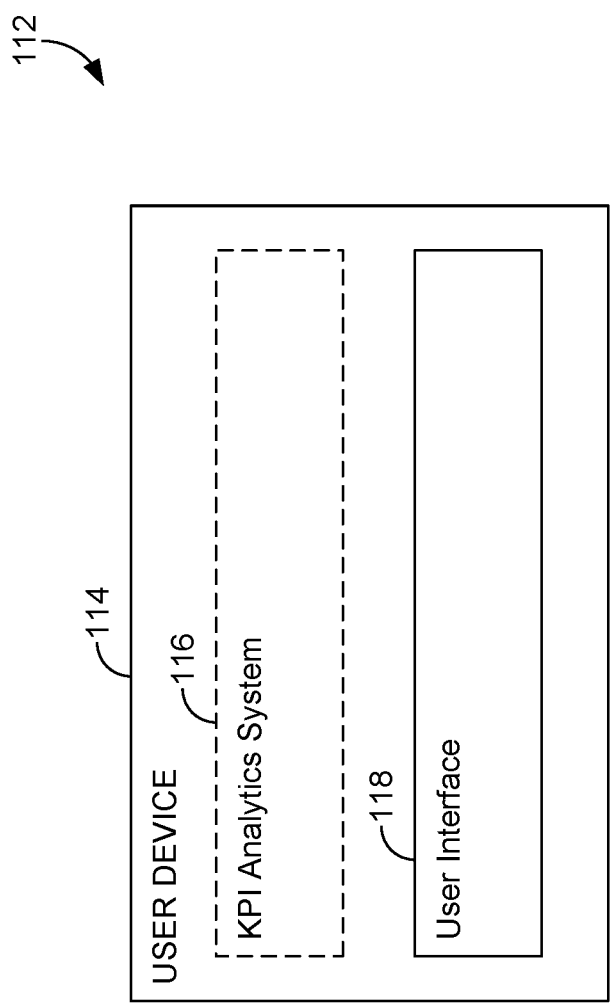
FIG. 1B depicts an example configuration of another operating environment in which some implementations of the present disclosure can be employed, in accordance with various embodiments.

Referring to FIG. 1B, aspects of an illustrative KPI analytics system are shown, in accordance with various embodiments of the present disclosure. FIG. 1B depicts a user device 114, in accordance with an example embodiment, configured to allow for generating actionable KPI-driven customer segments for predicting customer outcomes using a KPI analytics system 116. The user device 114 may be the same or similar to the user device 102a-102n and may be configured to support the KPI analytics system 116 (as a standalone or networked device). For example, the user device 114 may store and execute software/instructions to facilitate interactions between a user and the KPI analytics system 116 via the user interface 118 of the user device.

Figure 2:
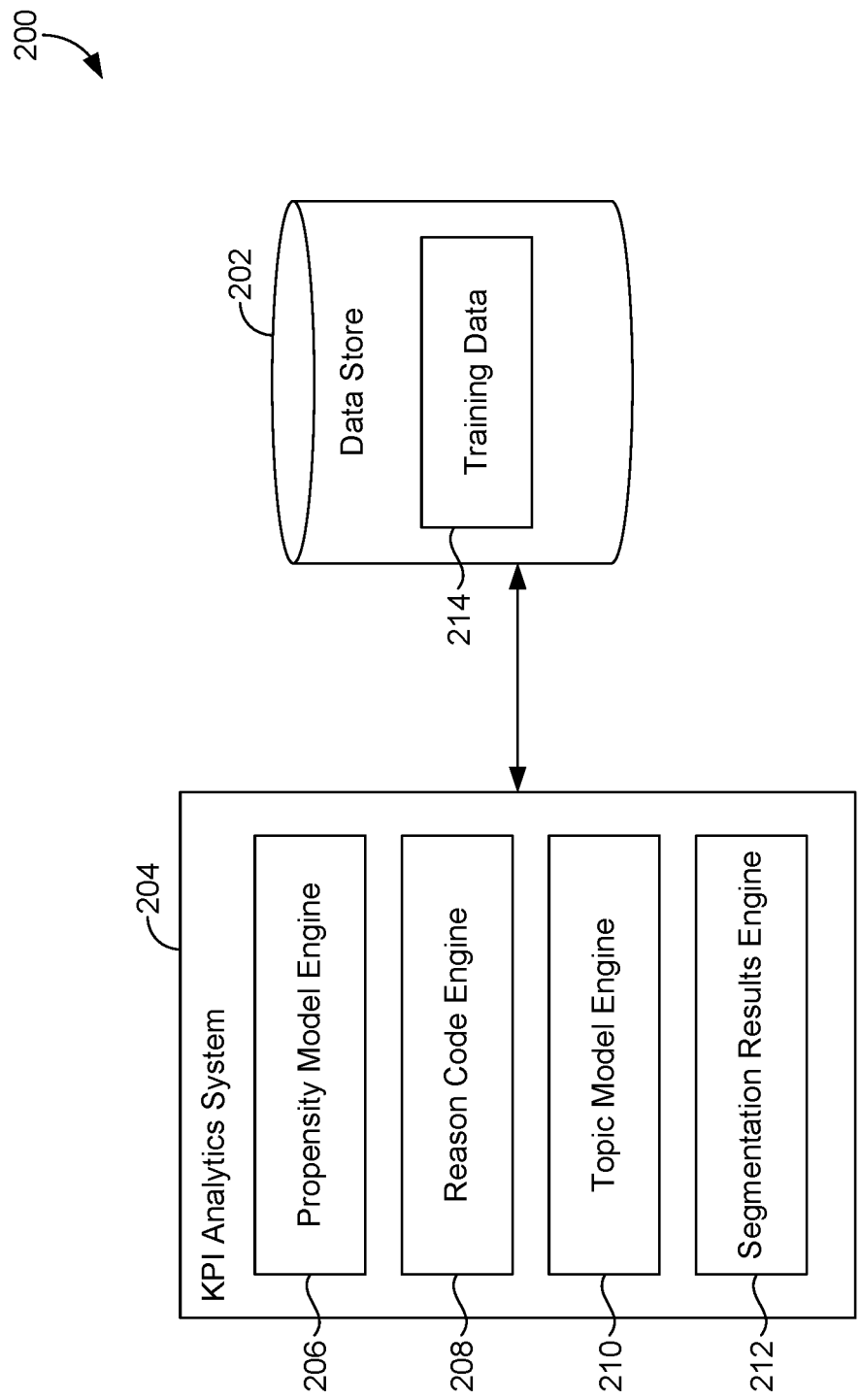
FIG. 2 depicts an example configuration of a further operating environment in which some implementations of the present disclosure can be employed, in accordance with various embodiments.

FIG. 2 depicts an example configuration of an operating environment in which some implementations of the present disclosure can be employed, in accordance with various embodiments. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory as further described with reference to FIG. 8. It should be understood that operating environment 200 shown in FIG. 2 is an example of one suitable operating environment. Among other components not shown, operating environment 200 includes a number of user devices, networks, and server(s).

As depicted, KPI analytics system 204 includes propensity model engine 206, reason code engine 208 and topic model engine 210, and segmentation results engine 212. The foregoing engines of KPI analytics system 204 can be implemented, for example, in operating environment 100 of FIG. 1A and/or operating environment 112 of FIG. 1B. In particular, those engines may be integrated into any suitable combination of user devices 102a and 102b through 102n and server(s) 106 and/or user device 114. While the various engines are depicted as separate engines, it should be appreciated that a single engine can perform the functionality of all engines. Additionally, in implementations, the functionality of the engines can be performed using additional engines and/or components. Further, it should be appreciated that the functionality of the engines can be provided by a system separate from the KPI analytics system.

As shown, KPI analytics system 204 operates in conjunction with data store 202. Data store 202 stores computer instructions (e.g., software program instructions, routines, or services), data, and/or models used in embodiments described herein. In some implementations, data store 202 stores information or data received via the various engines and/or components of KPI analytics system 204 and provide the engines and/or components with access to that information or data, as needed. Although depicted as a single component, data store 202 may be embodied as one or more data stores. Further, the information in data store 202 may be distributed in any suitable manner across one or more data stores for storage (which may be hosted externally).

In embodiments, data stored in data store 202 includes training data. Training data generally refers to data used in machine learning, or portion thereof. As such, training data can include user behavior, attributes, and features. In some cases, data can be received from and sent to KPI analytics system 204. In other cases, data can be received directly from user devices or from one or more data stores in the cloud.

KPI analytics system 204 generates data-driven actionable KPI customer segments related to customers of a business. Such a system can combine the explanatory power of predictive modeling with unsupervised learning to provide insight into analyzed user behavior data. In particular, the KPI analytics system 204 can cluster customers based on variables that lead to predicted outcomes to reflect why a group of customers is likely to reach/perform a particular outcome (e.g., purchase a product, subscribe to a product, upsell, downsell, etc.). Such customer segments with insight based on variables can be used, for instance, to generate effective targeting campaigns for particular customers. Actionable customer segments can be used to create specific targeting campaigns based on patterns of product usage that result in a particular outcome for a specific customer. For example, if the KPI analytics system 204 predicts that a customer is likely to unsubscribe with reasons why the customer is likely to unsubscribe, a campaign can be generated for that customer that specifically targets the customer to decrease their likelihood to unsubscribe.

By way of example to illustrate, churn can be the particular outcome analyzed by KPI analytics system 204. Churn can generally be defined as a customer unsubscribing from a product and/or leaving a particular business subscription. Churn scores can be used to designate the risk of a customer unsubscribing. While churn scores can be used to indicate what customers are at risk of unsubscribing, churn scores alone can fail to address how to prevent these customers from unsubscribing and/or why particular customers are at risk of unsubscribing. Accordingly, KPI analytics system 204 not only predicts churn outcomes for customers but also identifies variables that lead to the predicted churn outcome for each customer and generates customer segments using those variables.

Propensity model engine 206 generates a propensity model to predict how likely a user is to perform a particular outcome (e.g., churn). To generate a propensity model, historical user behavior data and/or user attributes are correlated with information about known outcomes. Raw user behavior data can be standardized to generate meaningful user behavior features (e.g., product use frequency, product use recency, product variety, etc.). Training data is generated by combining these user behavior features and/or user attributes (e.g., age of subscription, country, skill level, etc.) with known outcomes on a per-user level. The propensity model is then trained using the training data.

To obtain the training data, features can be generated from raw historical user event data. A pre-processing pipeline process can be utilized to generate features from raw data. Specifically, feature engineering can be performed on raw user event data. Raw user event data can be obtained from data store 202 (e.g., raw user event data stored in data store 202). Engineered features can generally be defined as user features that are processed such that the features can be input into the model. For instance, engineered features are the features that are used to train the model. While numeric variables can often be directly input into a model as a feature, categorical variables typically need to be converted in a way that they can input into the model. In this way, categorical variables such as user behavior and attributes can be standardized such that the model can process them accordingly.

A propensity model can be implemented using machine learning. In embodiments, logistic regression can be used to generate the propensity model. User data, including profile information (e.g., static features), usage information, and known outcomes can be used as training data for the model. In addition, outcomes can be defined in a certain time-frame window (e.g., 30 days). For instance, a propensity model generated for churn can be used to predict whether a customer is going to unsubscribe or take another action of interest in the next 30-day window.

The propensity model can be used to generate, for each customer, a predicted outcome related to a particular KPI of interest. The predicted outcome for each could be, for instance, a score reflecting the probability of the outcome. For instance, in the example of churn, the propensity model outputs a churn score indicating a likelihood of churn for a customer in a designated timeframe. The model can generate model coefficients for the engineered features of the model. An exemplary equation that can be used to represent a propensity model for an outcome of interest is as follows:

$$\text{logit(Outcome Probability)} = \beta_0 + \beta_1 X_1 + \beta_2 X_2 + \ldots + \beta_p X_p + \varepsilon$$

$X_1, \ldots, X_p$ indicate engineered features after standardization. $\beta_1, \ldots, \beta_p$ indicate the importance of the corresponding engineered features over the designated timeframe for the probability of an outcome of interest.

After the propensity model is generated, the model can be applied to existing customers to generate a predicted outcome for each customer, which could be a score indicating how likely the outcome is for a customer. An exemplary equation for a user i for applying the trained propensity model to predict an outcome can be:

$$\text{Outcome Probability}_i = \text{logit}^{-1}(\beta_0 + \beta_1 X_{i,1} + \beta_2 X_{i,2} + \ldots + \beta_p X_{i,p})$$

The propensity model can be updated periodically based on accuracy. For instance, the trained propensity model can be used to determine the probability of an outcome for an existing customer. After the designated timeframe for the determined probability has passed, an actual outcome for the existing customer is determined and the predicted outcome is compared with the actual outcome. When the predicted outcome does not match the actual outcome, the model can be updated with additional training data (e.g., when a predefined threshold level of outcomes are not correct).

Existing customers can have different usage data and profile information that can affect the prediction of whether an outcome will occur (e.g., whether the customer will churn). For example, if the propensity model has five different important variables, one customer might only have one and another customer might have two of those five. These variables can be designated using variable names as reason codes. A reason code in the present disclosure can be designated as a name for a variable (i.e., a feature) from the propensity model. In an embodiment, reason codes and corresponding contribution values can be obtained for each customer using the trained propensity model generated using propensity model engine 206. Reason codes and corresponding contribution values can indicate the extent to which each variable affects the predicted outcome for each customer. In other embodiments, reason codes can be obtained by building individual models for each variable (e.g., single variable reason codes).

The overall propensity model generated using propensity model engine 206 is optimized for predictive accuracy. When utilizing the trained model, an important aspect is the effect of each individual variable on the predicted outcome for each customer. The effect of each variable on the predicted outcome for a customer is reflected by a contribution value. In some cases, raw contribution scores output by the propensity model are used as the contribution values for the variables. However, the raw contribution scores from the propensity model might not be as interpretable as desired. To emphasize the effect of each variable, in some implementations, the raw contribution scores from the propensity model are converted to weights based on rank indicating importance of each variable to the predicted outcome.

Reason code engine 208 may be used to generate weights for reason codes based on importance of each variable for the predicted outcome at the user level. To perform this weighting, the raw contribution scores from the propensity model for each variable (i.e., reason code) are compared and encoded into an integer (referred to as a weight). For instance, the raw contribution scores for variables can be compared and encoded into an integer ranging from 1 to 10 with 10 being the most important.

Weighting can be done by assigning weights to reason codes as evenly as possible (e.g., if 100 variables, then approximately 10 will have 10 as a weight, approximately 10 will have 9 as a weight, etc.). In an embodiment, weighting can be assigned by first determining many customers actually have a particular reason code, and then weighting based on the percentage of people with the reason code, split into 10 bins. First, weighting by contribution can be performed, and then for each reason code determining how many customers have the reason code and doing a cumulated sum of coverage. In this way, the top 10% will be weighted 10, next 10% will be weighted 9, etc.

The reason codes and contribution values (e.g., raw contribution scores from the propensity model or weights) for each user can be placed into a user-reason code matrix. The user-reason code matrix provides, for each customer, a contribution value for each reason code (i.e., variable). As such, the user-reason code matrix reflects the impact of each reason code on the predicted outcome for each customer.

Topic model engine 210 generates a topic matrix and a user-topic matrix. The topic model engine uses a topic model as a clustering method to determine clusters and associated latent characteristics such that segments based on the latent characteristics can be generated. In embodiments, Non-Negative Matrix Factorization and/or Latent Dirichlet Allocation can be used as the topic model. The user-reason code matrix can be used to generate the topic matrix and the user-topic matrix.

The topic matrix sets forth a number of topics identified using the topic model. Each topic comprises a set of reason codes and a contribution level for each reason code reflecting which reason codes are the most important for defining a topic (e.g., how important each reason code is in defining a topic). Further, topics from the topic matrix can define customer segments. In this way, customers assigned to the same segments (i.e., topics) are customers with similar reasons for a particular outcome (e.g., customers with similar reasons to churn). The reason codes can be sorted for a topic by distribution such that higher contribution levels indicate reason codes that are more important to the topic.

The user-topic matrix contains a user identifier for each customer along with attribution values for each topic. The attribution value for a given topic and a given customer reflects an extent to which the reason codes for the customer correspond to the reason codes for the topic. The user-topic matrix can be leveraged to create segments by assigning customers to topics (e.g., segment) based on the attribution values. The user-topic matrix can be normalized such that for each user, the overall attribution for all the topics is equal to one. In some embodiments, the user-topic matrix can be used to assign a customer to a topic having the greatest attribution value for the customer. In other embodiments, a customer can be assigned to multiple topics.

Segmentation results engine 212 translates topics from the topic matrix into descriptive segment names that accurately convey a description of what it means for a customer to be assigned to a particular topic. For a particular topic, the top reason codes can be analyzed (e.g., based on weights). The top two or three reason codes can be examined in some embodiments. In other embodiments, when there is a large difference between scores, only the highest reason code can be examined (e.g., where scores distribution is, for example 0.4 to 0.07). The segmentation results engine can be used to indicate a general characterization for a topic (e.g., segmentation), designate what reason code(s) characterize the topic, and a description of the customers that make up the topic segment. Such results can be used to analyze the proportion of the customer base that falls into each segment. For example, these results can be utilized in business applications to determine the areas of opportunity (e.g., customers that are worth targeting in campaigns versus customers that are not worth targeting).

In some embodiments, customers can initially be segmented by predicted outcomes from the propensity model. For instance, such segmentations can group customers into low, medium and high probability groups for the outcome (e.g., low, medium, high risk of churn). For each of these separate groups, a separate topic model can be generated. Generating separate topic models for each group further allows for understanding aspects (e.g., variables and/or reason codes) of the group that increase the likelihood of the particular outcome. Histograms can also be used to visually group customers. For example, the first 50% of customers have generally low score values (e.g., where score percentile is on the x-axis and actual score is on the y-axis), typically the next 30% of customers start to have rising score values, and the last 20% of customers have steep (e.g., high) score values. Identifying customers based on risk can be useful, for example to a marketing user, because instead of trying to utilize something granular like a probability, the user can specifically indicate that they want to target the high risk customers.

Figure 3:
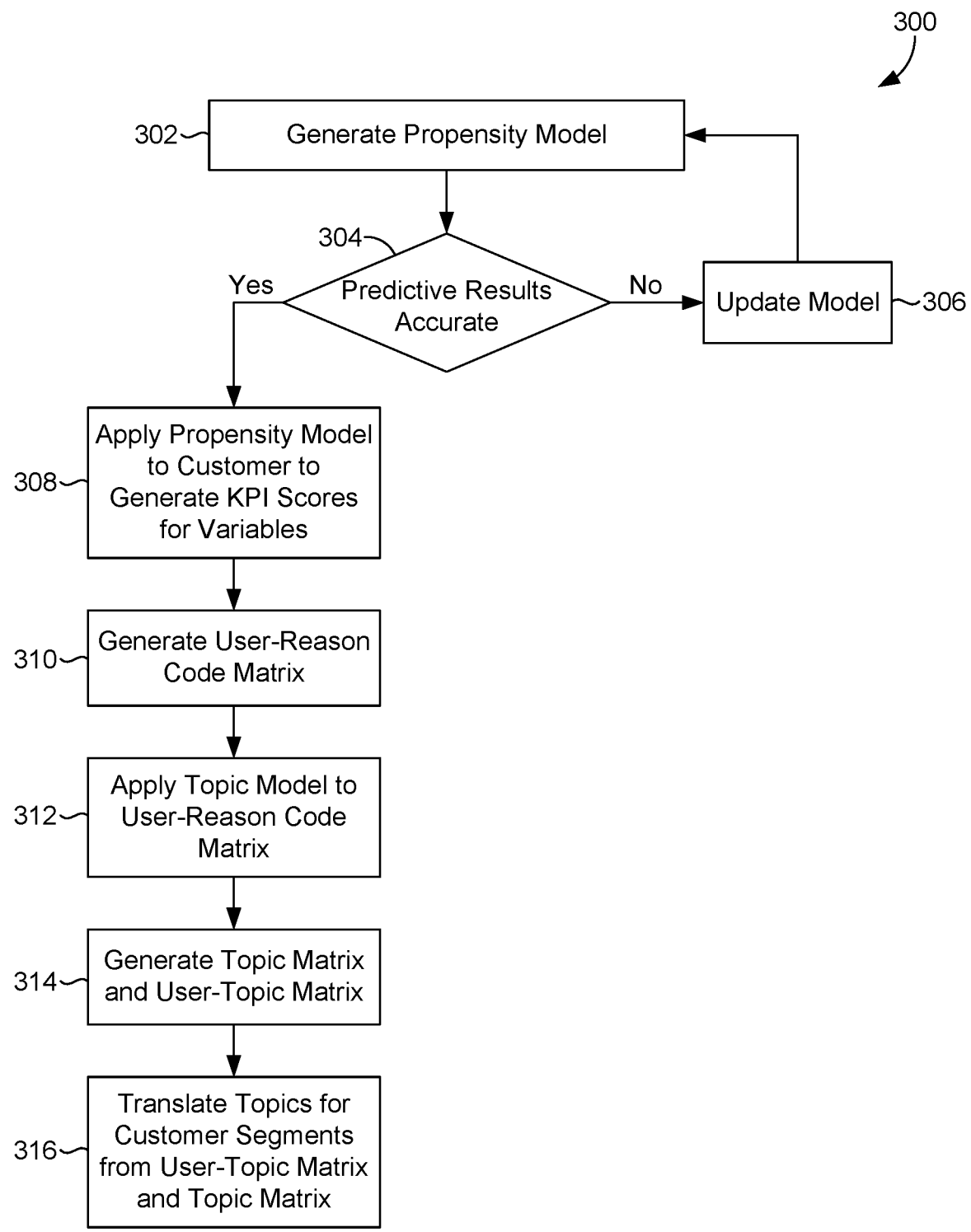
FIG. 3 provides a process flow showing an embodiment of generating actionable KPI-driven customer segmentation, in accordance with embodiments of the present disclosure.

Turning now to FIG. 3, a process flow shows an embodiment of method 300 for generating actionable KPI-driven customer segmentation, in accordance with embodiments of the present disclosure. Method 300 can be performed, for example by KPI analytics system 204, as illustrated in FIG. 2.

At block 302, a propensity model is generated. To build a propensity model, historical user behavior data and/or user attributes can be correlated with known outcomes of interest as training data. The propensity model can be implemented using machine learning using the training data to train the propensity model. The propensity model can be used to predict whether a customer is going take a particular outcome within a designated timeframe. The propensity model can be used to generate scores for likelihood of the outcome.

At block 304, accuracy of the propensity model is determined periodically. For instance, the trained propensity model can be used to determine the likelihood of an outcome for an existing customer. After a designated timeframe has passed, the predicted outcome can be compared with the actual outcome for the customer. When the predicted outcome does not match the actual outcome, at block 306, the propensity model can be updated with additional training data.

At block 308, the propensity model is applied to customers to generate, for each customer, a predicted outcome and a raw contribution score for each variable. The raw contribution score for each variable indicates an extent to which the variable impacts the predicted outcome for the customer. For instance, the raw contribution score can be viewed as the raw variable contributions from variable j for customer i (i.e., $\beta_j X_{i,j}$). In some embodiments, only variables that contribute to a predicted outcome (e.g., where $\beta_j X_{i,j} > 0$) are considered, and other variables are removed from further consideration. At block 310, a user-reason code matrix is generated. The user-reason code matrix includes reason codes corresponding to the variables from the propensity model. Additionally, the user-reason code provides, for each customer, a contribution value for each reason code. In some cases, the contribution values are the raw contribution scores from the propensity model. In other cases, the contribution values are weights generated based on the raw contribution scores. For instance, weights can be assigned using a ranking system from 1 to 10. A weight can be used to indicate which variable has the highest impact on a particular outcome (e.g., indicate a high risk of churn). The variables from the propensity model can be sorted and then weighted based on importance. For example, weights can be assigned from 1 to 10 to reflect the important of a variable. This rank can indicate the weight in the reason code. For instance, reason codes for a particular user can constitute a list of <variable name: weight> pairs.

At block 312, a topic model is applied to the user-reason code matrix. The form of user-reason code matrix is analogous to matrices used in natural language analysis (e.g., customers are documents, reason code labels are weights, and the reason code weights are frequencies). Utilizing such a matrix is advantageous because the matrix reflects the importance of each reason code. The form of the user-reason code matrix can be leveraged when the user-reason code matrix is further utilized in determining customer segmentation. In particular, the manner in which data is stored in such a matrix accurately conveys the importance of the reason codes during further analysis.

By applying the topic model to the user-reason code matrix, at block 314, a topic matrix and user-topic matrix are generated. A topic model clustering method can be used to determine clusters and associated latent characteristics such that segments based on the latent characteristics can be generated. Such segments can indicate topics along with reason codes with contribution levels that indicate importance of each reason code for each topic. The generated topic matrix can contain topics along with reason codes and corresponding reason code distributions that indicate which reason codes are the most important for defining a topic. The user-topic matrix can contain user identifiers along with attribution levels to different topics. The user-topic matrix can be used to assign customers to topics (i.e., segments) based on the maximum attribution value for each customer.

At block 316, the topics, reason codes, and corresponding reason code distributions can be used to generate user segments that tie to the KPI of interest. Together, the topic matrix and user-topic matrix can be used to designate actionable KPI-driven customer segments.

Figure 4:
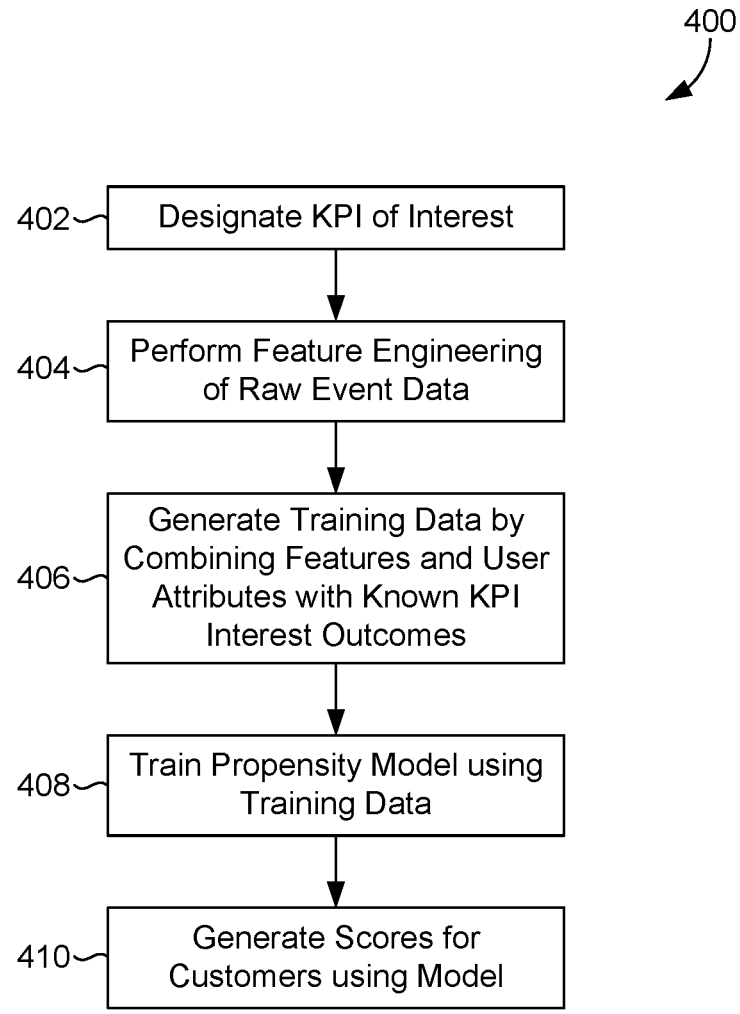
FIG. 4 provides a process flow showing an embodiment for generating and using a propensity model to predict outcomes for a KPI of interest, in accordance with embodiments of the present disclosure.

FIG. 4 provides a process flow showing an embodiment of method 400 for generating a propensity model and using the propensity model for existing customers, in accordance with embodiments of the present disclosure. Method 400 can be performed, for example by propensity model engine 206, as illustrated in FIG. 2.

At block 402, a KPI of interest is designated. KPIs of interest can include any key business objective (e.g., churn, conversion, upsell, downsell, customer retention, any business-related action). At block 404, feature engineering is performed on raw event data (e.g., historical user behavior data). Feature engineering can be used to convert the raw event data into information that can be processed to generate a model that correlates with the designated KPI of interest. For example, feature engineering standardizes raw data into a form that can be used to train the model. Numeric variables often do not require significant feature engineering and can be directly input into a model as a feature. Feature engineering of categorical variables can convert the variables into a form such that they can be input into the model and processed accordingly.

At block 406, training data is generated by combining the engineered features and user attributes along with known outcomes for the designated KPI of interest. Historical data with corresponding outcomes can be used to generate training data because outcomes related to the data are known. For instance, user behavior features and user attributes can be combined with known outcomes to form training data. Using such training data to generate a propensity model can leverage user attributes along with usage information to generate variables that summarize event data into meaningful features that correlate with known outcomes of interest. Such features can include, for example, product usage in terms of recency (e.g., when the last time a product was used), frequency of usage, average product usage over a designated period of days (e.g., last 30 days), product variety (e.g., in a use case with multiple different products), etc.

At block 408, a propensity model is trained using the training data. In embodiments, logistic regression can be used to generate the propensity model. Logistic regression can be used to correlate data based on relationships between variables. The form of the propensity model generated can have variables and weights of importance for each variable. In particular, the model can generate model coefficients for the engineered features of the model. An exemplary equation that can be used to represent a model for a KPI of interest as follows:

$$\text{logit(Outcome Probability)} = \beta_0 + \beta_1 X_1 + \beta_2 X_2 + \ldots + \beta_p X_p + \varepsilon$$

$X_1, \ldots, X_p$ indicate engineered features after standardization. $\beta_1, \ldots, \beta_p$ indicate the importance of the corresponding engineered features for the probability of outcome for the KPI of interest.

The propensity model is then used to generate predicted outcomes for customers, at block 410. A predicted outcome for a customer indicates a likelihood of the outcome for the customer. An exemplary equation for a user i for applying the trained propensity model to predict an outcome can be:

$$\text{Outcome Probability}_i = \text{logit}^{-1}(\beta_0 + \beta_1 X_{i,1} + \beta_2 X_{i,2} + \ldots + \beta_p X_{i,p})$$

In addition to generating a predicted outcome for each customer, the propensity model provides a raw contribution score for each variable used in the model, as shown at block 412. The raw contribution score for each variable reflects the extent to which each variable contributes to the predicted outcome for the customer.

Figure 5:
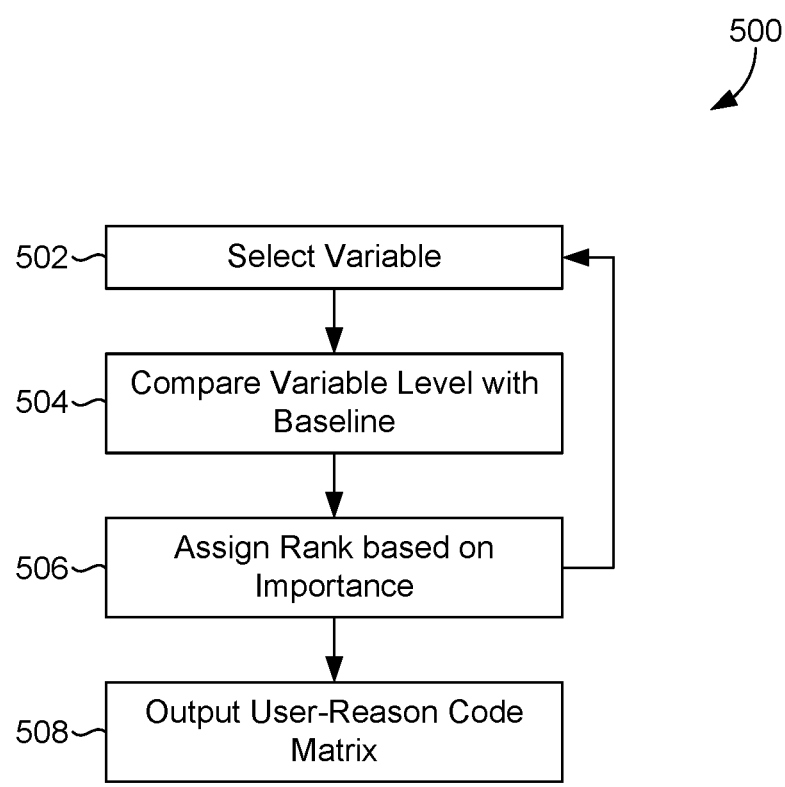
FIG. 5 provides a process flow showing an embodiment for generating a user-reason code matrix, in accordance with embodiments of the present disclosure.

FIG. 5 provides a process flow showing an embodiment of method 500 for generating a user-reason code matrix, in accordance with embodiments of the present disclosure. The user-reason code matrix can be comprised of reason codes and contribution values (which may be raw contribution scores or weights) for the reason codes. For instance, reason codes for a particular user can constitute a list of <variable name: weight> pairs. Method 500 can be performed, for example by reason code engine 208, as illustrated in FIG. 2.

At block 502, a variable (e.g., engineered feature) from a propensity model is selected. Such a variable or engineered feature can also be designated as a reason code. For example, in the exemplary equation representing a model for a KPI of interest:

$$\text{logit(KPI of Interest)} = \beta_0 + \beta_1 X_1 + \beta_2 X_2 + \ldots + \beta_p X_p + \varepsilon$$

$X_1, \ldots X_p$ indicate the variables (e.g., engineered features). Such a model can output raw variable contributions (e.g., variable j for user i is $\beta_j X_{i,j}$). Utilizing weighting can limit the variable contributions to cases where $\beta_j X_{i,j} > 0$ such that only factors contributing to a particular outcome are considered. As such, instead of using the raw contribution scores generated using the propensity model as, in some embodiments, the contributions from all p variables can be compared with a baseline and encoded into an integer (e.g., weight) ranging from 1 to 10.

At block 504, the corresponding raw contribution scores for the variable are compared with a baseline level. Baseline levels can be determined using the average rate for a particular KPI outcome of interest. For example, using PHOTOSHOP usage and churn rate. The baseline churn rate can be x. People that do not use Photoshop have a rate of y. People that did use Photoshop have a rate of z. The churn rate for people that did not use Photoshop would be higher because those customers are not as active as other customers in terms of using ADOBE products. In this way, the churn rate of customers who do not use PHOTOSHOP can be compared to the baseline churn rate. If the difference between these rates is high enough relatively, then this level of this variable can be designated as important (e.g., the larger the difference, the more important a variable).

At block 506, a weight is assigned to a variable (e.g., reason code). Weighting can be assigned independently for each variable (e.g., multiple variables can have the same weight assigned). To assign a weight, the percentage of how many consumers actually have a reason code can be determined. Then a variable can be assigned a weight using the corresponding raw contribution score of the variable and coverage (e.g., percentage of people with reason code). For example, thresholds for each level of weighting can be calculated based on raw contribution scores and coverage. In an embodiment with 5 reason codes, the reason codes can be weighted by raw contribution score and then coverage (10% of people have reason code 1, 20% have reason code 2, 5% of people have reason code 3, etc.). A cumulated sum of the coverage can be performed and then the reason codes are binned into 10 bins such that the top 10% are given a weight of 10, next 10% are given a rank of 9, and so on.

At 508, a user-reason code matrix is generated. The user-code matrix includes, for each customer, a weight associated with each reason code. Data of the user-reason code matrix is stored similarly to data stored in a matrix used in natural language processing (e.g., customers are documents, reason code labels are weights, and the reason code weights are frequencies). Utilizing data stored using such a matrix is advantageous because the matrix reflects the importance of each reason code such that the form of the matrix can be leveraged in later processing to determine customer segmentation. While the method 500 of FIG. 5 discusses generating a user-reason code matrix that includes weights for the reason codes, it should be understood that in other embodiments, the user-reason code matrix can be generated using raw contribution scores from the propensity model instead of weights.

Figure 6:
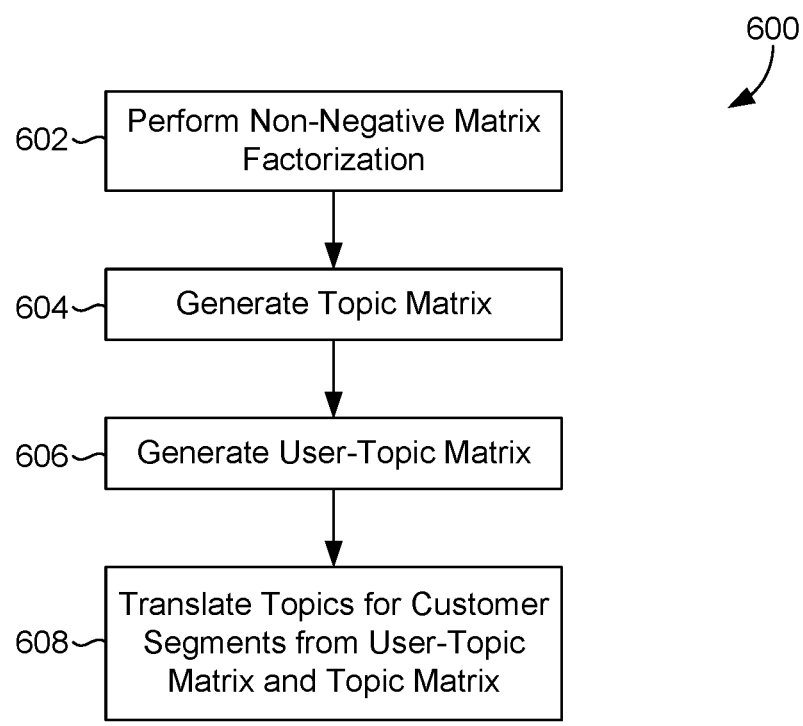
FIG. 6 provides a process flow showing an embodiment for generating KPI-driven and actionable customer segments, in accordance with embodiments of the present disclosure.

FIG. 6 provides a process flow showing an embodiment of method 600 for generating KPI-driven and actionable customer segments, in accordance with embodiments of the present disclosure. Method 600 can be performed, for example, by topic model engine 210 and segmentation results engine 212, as illustrated in FIG. 2.

At block 602, a topic model is used to generate, at block 604, a topic matrix and, at block 606, a user-topic matrix. Both Non-Negative Matric Factorization (NMF) and Latent Dirichlet Allocation (LDA) can be used. The topic matrix can contain all topics along with reason code distributions for each topic. The reason code distribution for a topic can include a contribution level for each reason code to indicate which reason codes are the most important for defining the topic (e.g., how important each reason code is in defining the topic). Further, topics from the topic matrix can define segments. In this way, customers assigned to the same segments (i.e., topics) are customers with similar reasons for a particular outcome (e.g., customers with similar reasons to churn). The reason code labels can be sorted by contribution level such that a higher contribution level can indicate a reason code is more important to a topic. The user-topic matrix can contain user identifiers along with attribution levels to different topics for each customer. The user-topic matrix can be leveraged to create segments by assigning a customer to a topic (e.g., segment) having the maximum level for the customer. The user-topic matrix can be normalized such that for each user, the overall attribution level for all the topics is equal to one. In embodiments, the user-topic matrix can be used to assign a customer to a topic segment for which the customer has the greatest attribution value. In other embodiments, a customer can be assigned to multiple topics.

At block 608, topics for customer segments from the user-topic matrix and topic matrix are translated into descriptive terms that accurately convey what it means for a customer to be assigned to a particular topic. For a particular topic, the top reason codes can be analyzed based on contribution levels. Assigning a customer to a topic (e.g., segmentation) can be used to determine applicable reason code(s) for the customer. These reason codes can characterize the topic and be used to generate a description of the customers that make up the topic segment. Such results can be used to analyze the proportion of the customer base that falls into each segment. For example, these results can be utilized in business applications to determine the areas of opportunity (e.g., customers that are worth targeting in campaigns versus customers that are not worth targeting).

FIGS. 7A-D depict illustrative matrices generated using a KPI analytics system, in accordance with various embodiments of the present disclosure. FIGS. 7A-D provide an example in which the KPI of interest is churn. Each of the matrices could be output by the KPI analytics system via graphical user interfaces (GUIs).

FIG. 7A depicts an embodiment of a user-reason code matrix generated by a KPI analytics system. As illustrated, FIG. 7A shows generated sample reason codes organized in a matrix form analogous to a document-term matrix in natural language processing. In such a matrix, the rows correspond to users, columns correspond to reason codes (e.g., variable names), and values correspond to reason code contribution weights (e.g., analogous to term frequency in natural language processing). Such a user-reason code matrix can be used as the input into topic modeling.

FIG. 7B depicts an embodiment of a topic matrix generated by a KPI analytics system. The topic matrix contains topics and corresponding reason codes with contribution levels. The topic matrix defines topics (segments) such that users assigned to the same segment are users with similar reasons to churn. Such a topic matrix can present a limited set of data to a user. For example, a limited set of topics can be designated such that the topics remain informative of customer segmentation while preventing significant overlap. For example, in an embodiment, for churn, there can be 9 topics along with 40 reason codes. Instead of returning all 9 topics with contribution levels for all 40 reason codes, a limited set can be selected and presented.

FIG. 7C depicts an embodiment of a user-topic matrix generated by a KPI analytics system. The user-topic matrix shows the attribution level of users for each topic (segment). The attribution levels across topics can be normalized such that the sum of the levels is equal to one.

FIG. 7D depicts an embodiment of a segmentation results table for churn prediction generated by a KPI analytics system. Such a table can be generated by performing a review of the reason code distribution of each topic. Data visualization can be performed to allow users to easily understand the segmentation results and assign appropriate labels to the segments. Further, translating topics from the topic matrix into a descriptive segment names, as depicted, can be helpful for communicating and deploying marketing campaigns based on the customer segmentation results.

Figure 8:
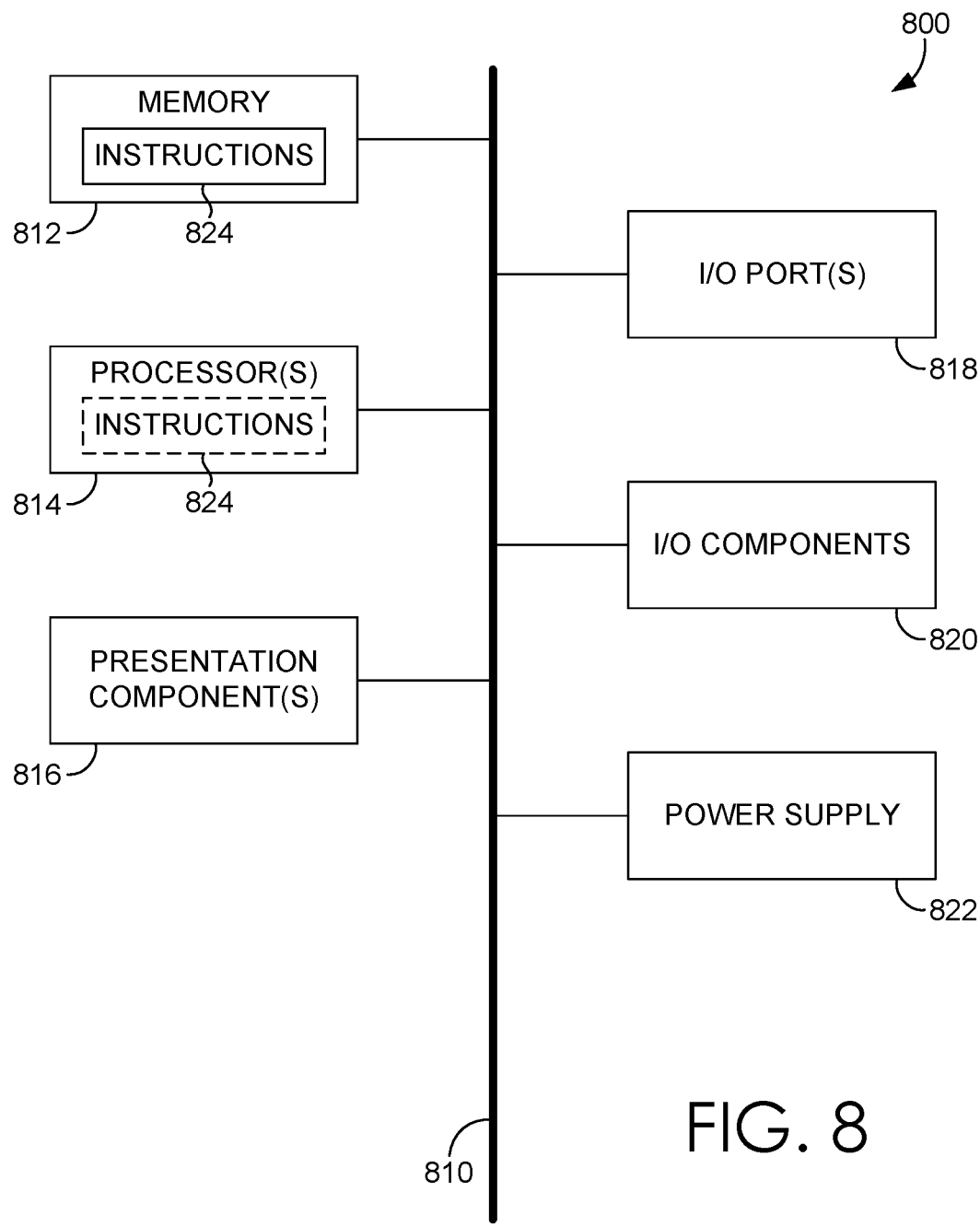
FIG. 8 is a block diagram of an example computing device in which embodiments of the present disclosure may be employed.

Having described embodiments of the present invention, FIG. 8 provides an example of a computing device in which embodiments of the present invention may be employed. Computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 8 is merely illustrative of an exemplary computing device that can be used in connection with one or more embodiments of the present invention. Distinction is not made between such categories as "workstation," "server," "laptop," "handheld device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 800 includes one or more processors that read data from various entities such as memory 812 or I/O components 820. Presentation component(s) 816 present data indications to a user or other device. Exemplary presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 800. Computing device 800 may be equipped with depth cameras, such as stereoscopic camera systems, infrared camera systems, RGB camera systems, and combinations of these, for gesture detection and recognition. Additionally, computing device 800 may be equipped with accelerometers or gyroscopes that enable detection of motion. The output of the accelerometers or gyroscopes may be provided to the display of computing device 800 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computer-implemented method, comprising:
   receiving, by one or more processors, raw event data that includes user behavior, user attributes, and features from one or more data stores;
   converting, by the one or more processors, the raw event data to training data by at least assigning each user a topic related to the user attributes based at least in part on feature engineering;
   training, by the one or more processors using a machine learning model, a propensity model to:
      predict a key performance indicator (KPI) of interest by combining the user behavior and the user attributes with known KPI outcomes on a per-user level, and
      determine a likelihood of an outcome for an existing customer based on the combining of the user behavior and the user attributes and a predicted KPI outcome;
   predicting, by the one or more processors using the trained propensity model, an outcome for the KPI of interest for each user of a plurality users based on the user behavior and the user attributes associated to at least one topic corresponding to a contribution value;
   determining, by the one or more processors using the trained propensity model, a likelihood of an outcome for an existing user of the plurality of users based on the user behavior and user attributes correlated with at least one historical outcome of interest;
   determining, by the one or more processors, whether the predicted outcome for at least a first user matches an actual outcome within a predefined threshold level by comparing the predicted outcome for at least the first user with the at least one historical outcome of interest;
   updating, by the one or more processors using the machine learning model, the propensity model with additional training data when the predicted outcome does not match, within the predefined threshold, the at least one historical outcome of interest;
   based on the updating of the propensity model, determining an impact of each reason code, of a plurality of reason codes, on the predicted outcome from the propensity model by at least encoding a contribution score into a weight value, each reason code representing a variable used by the propensity model to predict the outcome for the KPI of interest;
   in response to the determining of the impact, determining a contribution level for each of at least a portion of the plurality of reason codes indicating a rank of importance of each reason code in defining topic, of a plurality of topics;
   clustering user data of each user, of the plurality of users, to one or more clusters according to the contribution level from each of at least a portion of the plurality of reason codes; and
   based on the clustering, generating, by the one or more processors, a plurality of user segments, the generating of the plurality of user segments being indicative of assigning each of user, of the plurality of users, to at least one topic, of the plurality of topics.

2. The computer-implemented method of claim 1, wherein each contribution level comprises an integer weight determined by comparing raw contribution scores output by the propensity model.

3. The computer-implemented method of claim 1, wherein the determining of the impact is based on generating a user reason-code matrix that includes each reason code, of the plurality of reason codes.

4. The computer-implemented method of claim 3, wherein the determining of the contribution level is based on using the user-reason-code matrix as input and using a topic model to generate a topic matrix, the topic matrix includes the plurality of topics.

5. The computer-implemented method of claim 4, the method further comprising:
   generating a descriptive segmentation results table based on the topic matrix and a user-topic matrix by assigning labels to each user segment.

6. The computer-implemented method of claim 1, wherein each contribution level comprises a raw contribution score output by the propensity model.

7. The computer-implemented method of claim 1, wherein the updating of the propensity model is based on the predicted outcome for the first user failing to match the actual outcome for the current user.

8. The computer-implemented method of claim 1, the method further comprising:
   generating a targeted campaign for a particular user associated with a first customer segment based on a subset of reason codes associated with the first customer segment.

9. The computer-implemented method of claim 1, wherein the plurality of users are selected from a larger set of users based on the plurality of users having predicted outcomes within a predefined threshold level for the KPI of interest determined using the propensity model.

10. One or more computer storage media storing computer-useable instructions that, when used by one or more computing devices, cause the one or more computing devices to perform operations comprising:

receiving, by one or more processors, raw event data that includes user behavior and user attributes;

converting the raw event data to training data by at least assigning each user a topic related to the user attributes based at least in part on feature engineering;

training, using a machine learning model, a propensity model to predict a key performance indicator (KPI) of interest by combining the user behavior and/or the user attributes with known KPI outcomes on a per-user level;

training, using the machine learning model, the propensity model to determine a likelihood of an outcome for an existing customer based on the combined user behavior and user attributes and a predicted KPI outcome;

predicting, using the trained propensity model, an outcome for the KPI of interest for each user, of a plurality of users based on the user behavior and the user attributes associated to at least one topic corresponding to a contribution value;

determining, using the trained propensity model, a likelihood of an outcome for an existing user of the plurality of users based on the user behavior and user attributes correlated with at least one historical outcome of interest;

determining whether the predicted outcome for at least a first user matches an actual outcome within a predefined threshold level by comparing the predicted outcome for at least the first user with the at least one historical outcome of interest associated with at least first user;

updating, using the machine learning model, the propensity model with additional training data when the predicted outcome does not match, within the predefined threshold, the at least one historical outcome of interest;

determining an impact of each reason code, of a plurality of reason codes, on the predicted outcome from the propensity model, each reason code representing a variable used by the propensity model to predict the outcome for the KPI of interest;

in response to the determining of the impact, determining a contribution level for each of at least a portion of the plurality of reason codes indicating a rank of importance of each reason code in defining a topic, of a plurality of topics;

clustering user data of each user, of the plurality of users, to one or more clusters according to the contribution level for each of at least the portion of the plurality of reason codes; and based on the clustering, generating, by the one or more processors, a plurality of user segments, the generating of the plurality of user segments being indicative of assigning each user, of the plurality of users, to at least one topic, of the plurality of topics.

11. The computer storage media of claim 10, wherein each contribution level comprises an integer weight determined by comparing raw contribution scores output by the propensity model.

12. The computer storage media of claim 10, wherein the determining of the impact is based on generating a user reason-code matrix that includes each reason code, of the plurality of reason codes.

13. The computer storage media of claim 12, wherein the determining of the contribution level is based on using the user-reason-code matrix as input and using a topic model to generate a topic matrix, the topic matrix includes the plurality of topics.

14. The computer storage media of claim 13, the operations further comprising:

generating a descriptive segmentation results table based on the topic matrix and a user-topic matrix by assigning labels to each user segment.

15. The computer storage media of claim 10, wherein one or more features are determined not to contribute to the predicted outcome for each user from the plurality of users based on the propensity model, and the one or more features are excluded from other features that are determined to contribute to the predicted outcome.

16. A computing system comprising: one or more processors; and one or more computer storage media storing computer-useable instructions that, when used by the one or more processors, cause the computing system to:

receiving, by one or more processors, raw event data that includes user behavior and user attributes;

convert the raw event data to training by at least assigning each user a topic related to the user attributes data based at least in part on feature engineering;

train, using a machine learning model, a propensity model to:

predict a key performance indicator (KPI) of interest using the training data by combining the user behavior and/or the user attributes with known KPI outcomes, and determine a likelihood of an outcome for an existing customer based on the combined user behavior and the user attributes and a predicted KPI outcome;

predicting, using the trained propensity model, an outcome for the KPI of interest for each user, of a plurality of users based on the user behavior and the user attributes associated to at least one topic corresponding to a contribution value;

determining, using the trained propensity model, a likelihood of an outcome for an existing user of the plurality of users based on the user behavior and user attributes correlated with at least one historical outcome of interest;

determining whether the predicted outcome for at least a first user matches an actual outcome within a predefined threshold level by comparing the predicted outcome for at least the first user with the at least one historical outcome of interest associated with at least first user;

updating, using the machine learning model, the propensity model with additional training data when the predicted outcome does not match, within the predefined threshold, the at least one historical outcome of interest;

based at least in part on the updating of the propensity model, determining a contribution level for each of at least a portion of a plurality of reason codes indicating a rank of importance of each reason code in defining a topic, of a plurality of topics;

clustering user data of each user, of the plurality of users, to one or more clusters according to the contribution level for each of at least a portion of the plurality of reason codes; and based on the contribution level and the clustering, generating, by the one or more processors, a plurality of user segments, the generating of the plurality of user segments being indicative of assigning each user, of the plurality of users, to at least one topic, of the plurality of topics.

* * * * *